US007725113B2

(12) United States Patent
Fiedelak et al.

(10) Patent No.: US 7,725,113 B2
(45) Date of Patent: May 25, 2010

(54) MOBILE REFERENCE STATION FOR PRODUCTION OF CORRECTION SIGNALS FOR A DIFFERENTIAL POSITION-FINDING DEVICE

(75) Inventors: Jens Fiedelak, Wiebelskirchen (DE); Arnold Rutz, Zweibrucken (DE)

(73) Assignee: Deere & Company, Moline, IL (US)

( * ) Notice: Subject to any disclaimer, the term of this patent is extended or adjusted under 35 U.S.C. 154(b) by 542 days.

(21) Appl. No.: 11/686,489

(22) Filed: Mar. 15, 2007

(65) Prior Publication Data

US 2007/0236388 A1 Oct. 11, 2007

(30) Foreign Application Priority Data

Apr. 7, 2006 (DE) ........................ 10 2006 016 396

(51) Int. Cl.
*H04W 24/00* (2009.01)
*G01S 1/00* (2006.01)
(52) U.S. Cl. ............. 455/456.1; 455/456.6; 342/357.01
(58) Field of Classification Search ............. 455/456.1, 455/456.6, 456.7, 422.1, 457; 342/357.01, 342/357.03, 357.06
See application file for complete search history.

(56) References Cited

U.S. PATENT DOCUMENTS 6,100,842 A 8/2000 Dreier et al.
6,140,959 A * 10/2000 Gudat et al. ........... 342/357.12
6,380,888 B1 4/2002 Kucik
6,611,738 B2 * 8/2003 Ruffner ........................ 701/23
6,674,687 B2 * 1/2004 Zeitzew ........................ 367/6
6,941,208 B2 * 9/2005 Mahoney et al. .............. 701/50
2005/0012660 A1 1/2005 Nielsen et al.
2005/0110676 A1 5/2005 Heppe et al.
2005/0213533 A1 * 9/2005 Jin .............................. 370/328

FOREIGN PATENT DOCUMENTS

DE 195 39 302 A1 4/1997
DE 19639302 3/1998
EP 0 660 660 B2 4/2002

OTHER PUBLICATIONS

European Search Report dated Aug. 7, 2007.

* cited by examiner

*Primary Examiner*—Sonny Trinh

(57) ABSTRACT

A reference station produces correction signals for a differential position-finding device. The station utilizes a position-finding signal receiver for reception of signals from satellites in a position-finding system and an electronic processor, which is connected by a transmission unit to a radio antenna. The electronic processor is designed to receive position signals from the position-finding signal receiver and to derive correction data from these position signals. The correction data can be modulated by the transmission unit onto a radio frequency signal and can be transmitted via the radio antenna. The processor is connected to an inertial sensor to calculate any position change of the reference station, and to produce an error signal when the calculated magnitude of the position change exceeds a predetermined threshold value.

18 Claims, 3 Drawing Sheets

MOBILE REFERENCE STATION FOR PRODUCTION OF CORRECTION SIGNALS FOR A DIFFERENTIAL POSITION-FINDING DEVICE

FIELD OF THE INVENTION

The invention relates to a mobile reference station for production of correction signals for a differential position-finding device, comprising:

a position-finding signal receiver for reception of signals from satellites in a position-finding system, an electronic processor, which is connected by a transmission unit to a radio antenna and is designed to receive position signals from the position-finding signal receiver and to derive correction data from these position signals, which correction data can be modulated by the transmission unit onto radio frequencies and can be transmitted via the radio antenna.

BACKGROUND OF THE INVENTION

In agriculture, satellite-based position-finding systems are used, inter alia, for automatic steering of agricultural vehicles, for position-specific recording of data, for example yield data, and for position-specific driving of actuators, for example for the spreading of fertilizers or chemicals.

Satellite-based position-finding systems such as GPS, Glonass or the future Galileo use a plurality of satellites which are in orbit around the earth, are equipped with atomic clocks and in each case transmit electromagnetic (radio) waves which contain time and identity and/or position information. The associated receivers each have to receive the signals from at least three satellites in order to allow them to determine their current position in three dimensions. If, in addition, it is also intended to determine the current time, it is necessary to receive signals from four satellites.

It is also normal practice (see EP 0 660 660 B) to improve the accuracy of position-finding systems by reception of radio signals which contain correction data and are transmitted from reference stations at known locations. These systems are referred to as differential position-finding systems (for example, DGPS). The reference stations receive signals from satellites in the position-finding system and use these signals to derive position information, which they convert to correction data and transmit by means of a radio transmitter to the vehicle, which is equipped with a suitable receiver for reception of the correction data. A computer uses the correction data and the signals received from the satellites to determine the position of the vehicle. On the one hand, so-called wide area systems with stationary and networked reference stations, and on the other hand local reference stations are known, which may be mobile and are in general positioned in the vicinity of the respective field to be worked on, or are installed permanently at elevated locations. One advantage of the use of a local reference station for position finding opposed to a wide area system is the considerably greater accuracy which is achieved because network delay times are avoided, and the correction signal is generated in the immediate vicinity of where it is being used. Systems such as these are used for dynamic measures or for steering of moving machines, because of their high accuracy, and are thus also referred to as Real Time Kinematic (RTK) systems.

Mobile reference stations are subject to a certain risk of being moved during operation, for example because they are blocking a track or the like and are therefore moved out of the way by a third party. A reference station installed on a stand can also be blown over by a relatively strong wind. Any movement of the reference station leads to an analogous movement of a vehicle which has been automatically steered on the field, and thus represents a considerable safety risk.

This is because the reference station cannot itself decide whether the position change is caused by movement of the station itself or leads to the supposition of other errors or faults. In fact, it still transmits the correction data to the vehicle, although this is now based on a new position of the reference station. Since the vehicle computer is now presented with different correction data, it also calculates different position information. Since this differs from the nominal position, a vehicle steering system produces correspondingly counteracting steering data which leads to the undesirable steering movement that has been mentioned, in order to guide the vehicle back onto the nominal path. Only if a position change assumes values which lead to the belief that system-imminent errors or faults are improbable will the reference station transmit a warning message to the vehicle, and will switch the correction signal off. However, by this time the vehicle may already be several meters away from the nominal course.

SUMMARY OF THE INVENTION

The present invention provides a device which interacts with a mobile reference station for finding the position of an agricultural vehicle, in which the stated problems no longer occur, or occur to a lesser extent.

A mobile reference station which in particular is suitable for interaction with a differential position-finding device for determination of the position of an agricultural vehicle has a position-finding signal receiver for reception of signals from satellites in a position-finding system, and an electronic processor, which is connected by a transmission unit to a radio antenna and, during operation, receives position signals from the position-finding signal receiver and derives correction data from these position signals, which correction data is modulated by the transmission unit onto radio frequencies, and is transmitted via the radio antenna. It is proposed that the processor be connected to an inertial sensor and that the processor use signals from the inertial sensor to calculate a variable which is dependent on any position change of the reference station, and produce an error signal when this variable exceeds a predetermined threshold value. This variable may be the position change, its rate or the acceleration of the reference station. If the magnitude of this variable exceeds a predetermined threshold value which, for example, may be in the cm, cm/s or cm/s$^2$ range, an error signal is produced.

The error signal can be used in order to terminate the transmission of the correction data by the reference station. The vehicle steering system, which is equipped with a differential position-finding device which interacts with the reference station can then if necessary access a different correction signal, or can continue processing without correction data. This avoids undesirable steering movements of the vehicle. Furthermore, the error signal can be transmitted via the transmission unit and the radio antenna. An operator of a vehicle which is equipped with a differential position-finding device which interacts with the reference station can in this way be informed virtually immediately of a possible error or fault in the reference station and can himself take further measures, in particular can steer the vehicle manually or can stop it, and can move the reference station back to its original nominal position.

The inertial sensor is preferably physically connected to the position-finding signal receiver, for example by being arranged in a common housing. In one possible embodiment, the position-finding signal receiver and the inertial sensor, possibly as well as the processor and the transmission unit, are fitted on a common board. The inertial sensor may be a component of an inertial navigation system for a machine, which system is used to compensate for any offset between the position-finding signal receiver and the wheels or other reference points on the machine (or as a navigation aid if the position-finding signal receiver fails).

The inertial sensor may be a component of a inertial navigation system as is used on board vehicles. By way of example, it may be assumed that the position of the reference station has changed if the inertial navigation system determines values for a position change or rate of position change or acceleration which are greater than the normal drift of systems such as these.

BRIEF DESCRIPTION OF THE DRAWINGS

One exemplary embodiment of the invention will be described in more detail in the following text and is illustrated in the drawings, in which.

DESCRIPTION OF THE PREFERRED EMBODIMENT

Figure 1:
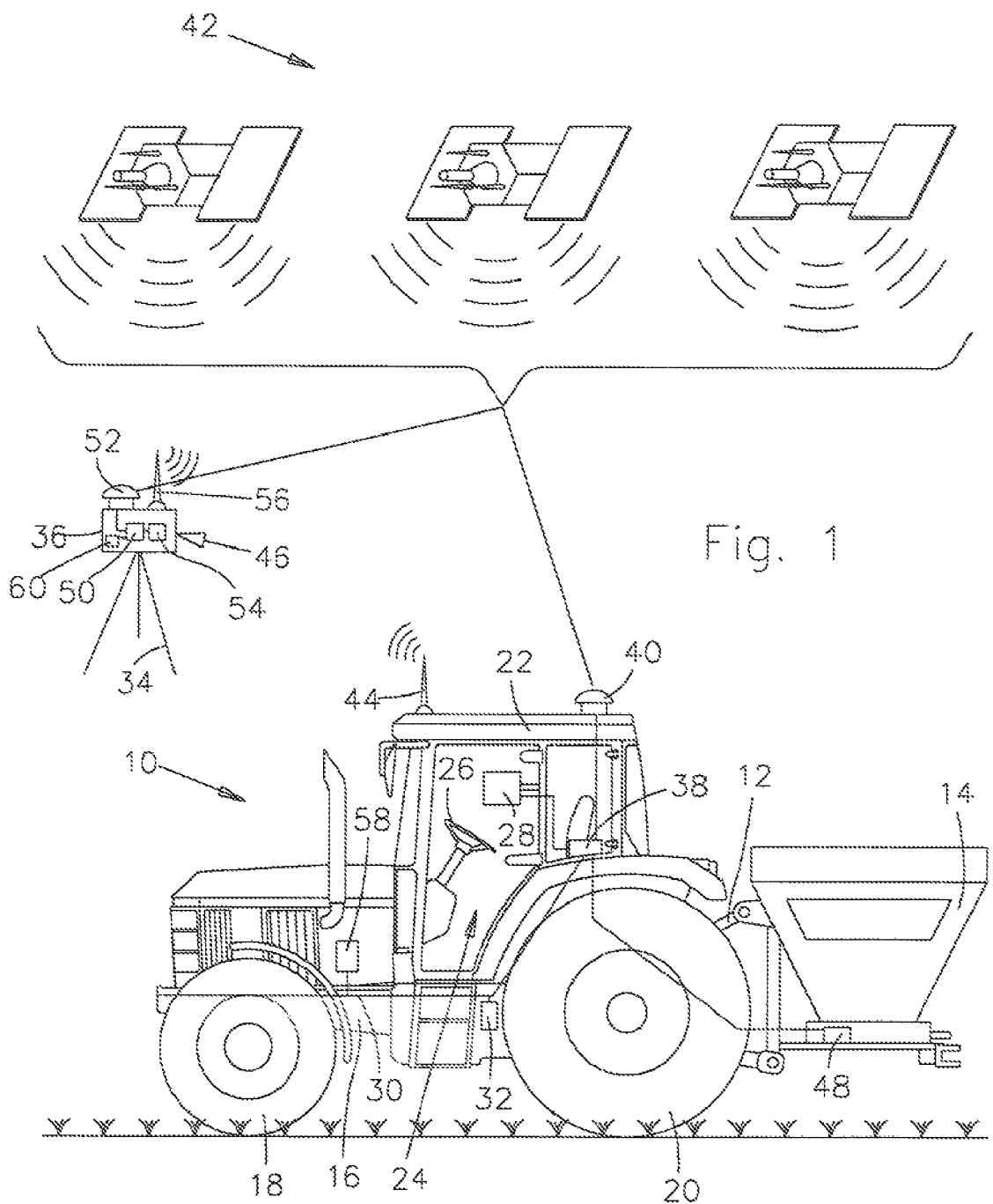
FIG. 1 shows a side view of a mobile reference station and of an agricultural vehicle which interacts with it.

FIG. 1 shows a side view of an agricultural vehicle 10 in the form of a tractor and of a working machine 14, which is fitted to a three-point linkage 12 on the vehicle 10 and is in the form of a centrifugal fertilizer spreader. The vehicle 10 is built on a load-bearing frame 16, which is supported on steerable front wheels 18 and drivable rear wheels 20 and has a cab 22 in which an operator workstation 24 is located. The operator workstation 24 comprises a steering wheel 26, and a virtual terminal 28. The virtual terminal 28 is connected to a data transmission device 30 which, in the illustrated embodiment, is a serial data bus.

The data transmission device 30 is also connected to a computer 38 which is connected directly or via the data transmission device 30 to a position-finding signal receiver 40 for reception of signals from satellites 42 in a position-finding system (for example GPS, Glonass or Galileo) and to a correction data receiver 44 which is used for reception of correction data that has been modulated onto radio waves and is transmitted from a mobile reference station 46. Furthermore, the computer 38 is connected to an inertial navigation system 32.

The mobile reference station 46 has a tripod stand 34 on which a housing 36 is mounted which contains an electronic processor 50 which is connected to a position-finding signal receiver 52, to an inertial sensor 60 and via a transmission unit 54 to a radio antenna 56. The inertial sensor 60 in this embodiment is in the form of an inertial navigation system that is known and is used in vehicles. This is arranged within the housing 36 of the reference station 46.

During operation, the mobile reference station is positioned at the edge of a field or at some other suitable point.

Figure 2:
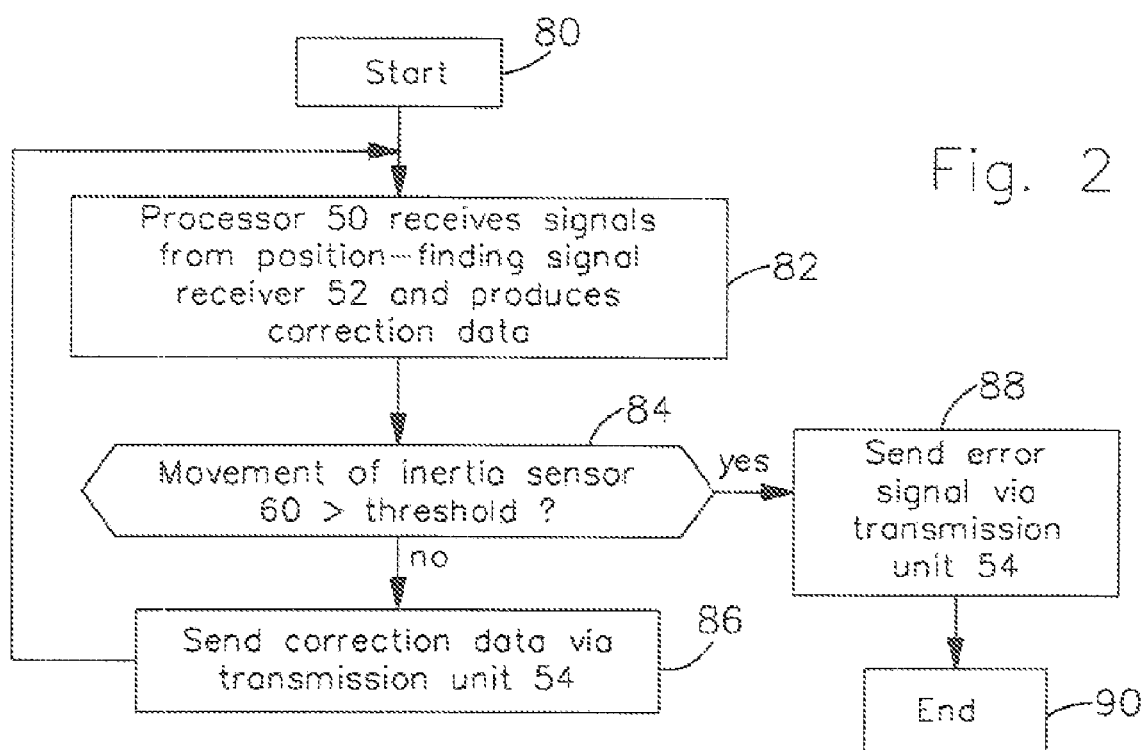
FIG. 2 shows a flowchart as used by the processor in the reference station.

The operation of the reference station 46 will be described in the following text with reference to the flowchart illustrated in FIG. 2. After the start in step 80 (that is to say with the reference station 46 being switched on and started up), the position-finding signal receiver 52 applies position signals to the processor 50 in step 82, which position signals it derives from signals which it receives from the satellites 42. The processor 50 uses the received position signals and its known position to produce correction data, which can be calculated as the difference between the true position and the measured position, and can be stated as a correction vector. In step 84, the processor then checks whether the signals from the inertial sensor 60 indicate that the inertial sensor 60 and, with it, the reference station 46 have moved with respect to the ground (or have a movement speed or acceleration) which is greater than a threshold value which, for example, corresponds to three times the normal drift for an inertial navigation system. If this is not the case, this is followed by step 86, in which the correction data is modulated by the transmission unit 54 onto radio frequencies, and is transmitted via the radio antenna 56.

Otherwise, this is followed by the step 88, in which an error signal is transmitted via the transmission unit 54. The step 86 is once again followed by the step 82; with the procedure end in step 90 following the step 88.

Figure 3:
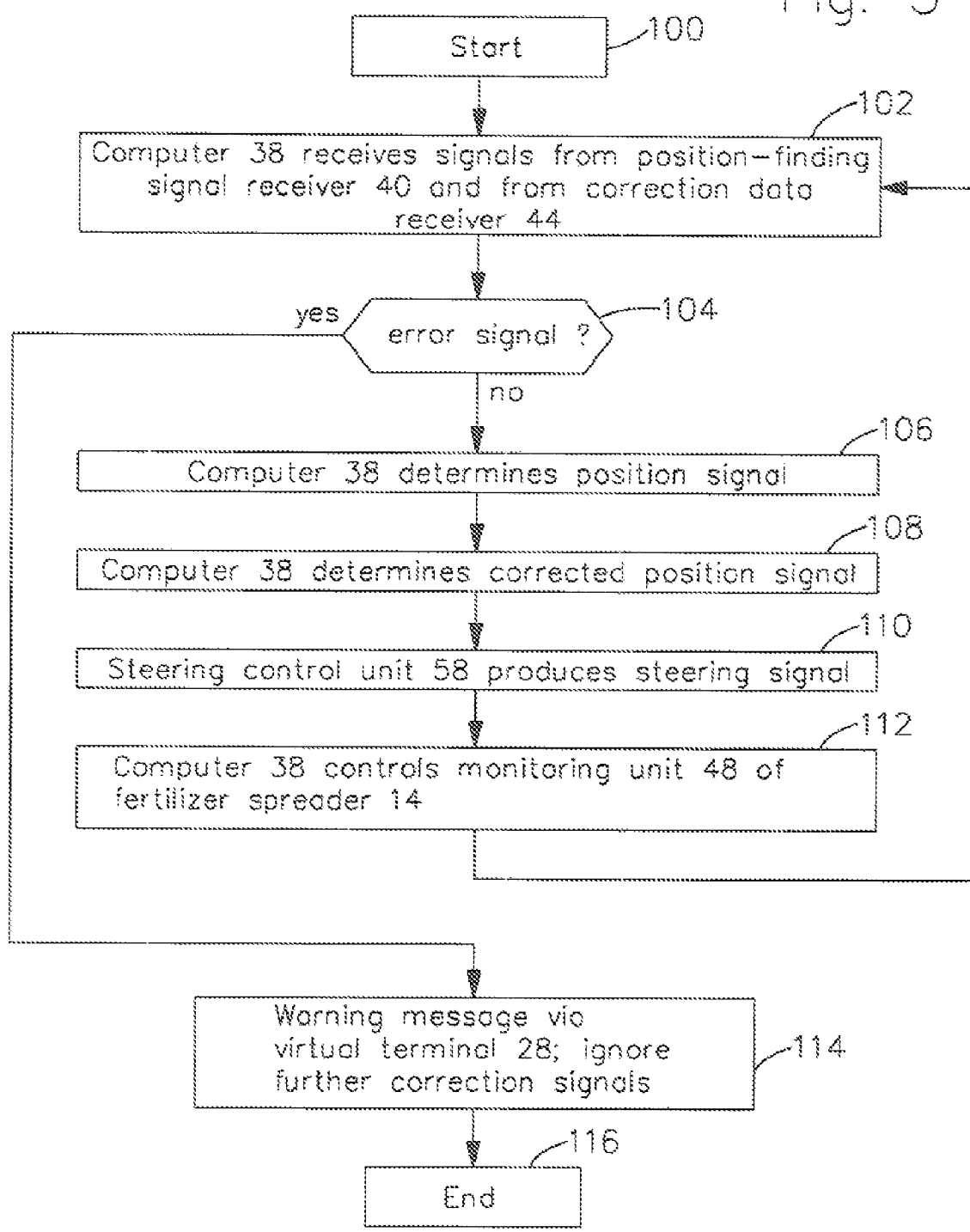
FIG. 3 shows a flowchart as used by the computer in the vehicle.

FIG. 3 shows a flowchart as used by the computer 38 in the vehicle 10. After the start in step 100, the computer 38 has signals applied to it in step 102 from the position-finding signal receiver 40, and has signals applied to it from the transmission unit 54 via the correction data receiver 44. This is followed by step 104, in which the computer 38 investigates whether the transmission unit 54 has transmitted an error signal. If this is not the case, in step 106 the computer 38 uses the signals from the position-finding signal receiver 40 to calculate a position signal, whose accuracy it improves on the basis of the correction data received by the transmission unit 54 from the reference station 46.

The inertial navigation system 32 in the vehicle 10 applies information about any yaw angle and roll angle on the vehicle 10 to the computer 38. In step 108, the computer 38 uses the signals from the inertial navigation system 32 in order to compensate for the offset between the front wheels 18 and the position-finding signal receiver 40, when the vehicle 10 is travelling over uneven terrain. The signals from the inertial navigation system 32 can also be used in order to allow steering signals to be produced in the event of temporary failure of the signals from the position-finding signal receiver 40 and/or from the correction data receiver 44.

In step 110, the compensated position signal is compared by a steering control unit 58, which is connected via the data transmission device 30 to the computer 38, with a nominal position along a stored nominal path, and is used to produce a steering signal, which drives a steering cylinder (not shown) in order to steer the front wheels 18.

Furthermore, in step 112, the original position signal or the compensated position signal is used by the computer 38 to drive a monitoring unit 48 for position-specific control of the fertilizer spreader 14 on the basis of a fertilization plan. In step 112, the computer 38 could also record data for example relating to the state of the plant growth, or yield data in the case of a combine harvester or chaff cutter.

If step 104 (based on step 84) indicates that the position of the reference station 46 has changed, it can be assumed that the reference station 46 has been moved away from its nominal position, for example because it was in the way of a third party or has fallen over, for example as a result of the wind or an animal passing it. In step 114, which follows in the event of an error signal in step 104, the computer 38 passes a warning message via the virtual terminal 28 to the operator in the driver's cab 22. The driver is thus informed of a possible error or fault. Furthermore, the computer 38 subsequently ignores any correction signals arriving from the reference station 46.

This prevents excessive steering movements of the front wheels 18. After step 114, the procedure is then ended in step 116.

The automatic steering process can however now be continued without correction data from the reference station 46, or with correction data once the reference station 46 has been moved back to the intended position, and this position has been confirmed by an input by means of an interface (not shown) which is connected to the processor 50. Alternatively, the driver can carry out the steering process by means of the steering wheel 26.

Having described the preferred embodiment, it will become apparent that various modifications can be made without departing from the scope of the invention as defined in the accompanying claims.

The invention claimed is:

1. A reference station for production of correction signals for a differential position-finding device positioned remotely from the reference station, the reference station comprising:
   a position-finding signal receiver for reception of signals from satellites in a position-finding system;
   an electronic processor, which is coupled by a transmission unit to a radio antenna and is designed to receive position signals from the position-finding signal receiver and to derive correction data from these position signals, which correction data can be modulated by the transmission unit onto a radio frequency signal for transmission via the radio antenna to the differential position- finding device; and
   the processor further connected to an inertial sensor at the reference station, the processor operable to use signals from the inertial sensor to calculate a variable which is dependent on any position change of the reference station and to produce an error signal when the variable exceeds a predetermined threshold value.

2. The reference station according to claim 1, wherein the processor can be operated to end the transmission of correction data in response to an error signal.

3. The reference station according to claim 2, wherein the processor can be operated to transmit the error signal via the transmission unit and the radio antenna.

4. The reference station according to claim 3, wherein the inertial sensor is physically connected to the position-finding signal receiver.

5. The reference station according to claims 4, wherein the inertial sensor is a component of an inertial navigation system.

6. The reference station according to claims 3, wherein the inertial sensor is a component of an inertial navigation system.

7. The reference station according to claim 2, wherein the inertial sensor is physically connected to the position-finding signal receiver.

8. The reference station according to claims 7, wherein the inertial sensor is a component of an inertial navigation system.

9. The reference station according to claims 2, wherein the inertial sensor is a component of an inertial navigation system.

10. The reference station according to claim 1, wherein the processor can be operated to transmit the error signal via the transmission unit and the radio antenna.

11. The reference station according to claim 10, wherein the inertial sensor is physically connected to the position-finding signal receiver.

12. The reference station according to claims 11, wherein the inertial sensor is a component of an inertial navigation system.

13. The reference station according to claims 10, wherein the inertial sensor is a component of an inertial navigation system.

14. The reference station according to claim 1, wherein the inertial sensor is physically connected to the position-finding signal receiver.

15. The reference station according to claims 14, wherein the inertial sensor is a component of an inertial navigation system.

16. The reference station according to claim 1, wherein the inertial sensor is a component of an inertial navigation system.

17. The reference station of claim 16, wherein the threshold value is greater than the normal drift of an inertial navigation system.

18. The reference station according to claim 1 wherein the variable comprises a position change of the reference station or an acceleration of the reference station.

* * * * *